United States Patent
Lin et al.

(10) Patent No.: US 12,224,659 B2
(45) Date of Patent: Feb. 11, 2025

(54) CHARGING DEVICE AND SAFETY FUNCTION CONTROL CIRCUIT AND METHOD THEREOF

(71) Applicant: FSP TECHNOLOGY INC., Taoyuan (TW)

(72) Inventors: Che-Min Lin, Taoyuan (TW); Kuo-Chieh Chan, Taoyuan (TW); Kuan-Jung Lee, Taoyuan (TW); Chi-Chang Lien, Taoyuan (TW); Ching-Chia Chu, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 248 days.

(21) Appl. No.: 18/102,784

(22) Filed: Jan. 30, 2023

(65) Prior Publication Data
US 2023/0261564 A1 Aug. 17, 2023

(30) Foreign Application Priority Data
Feb. 11, 2022 (TW) .................................. 111105171

(51) Int. Cl.
*H02J 7/00* (2006.01)
*H02M 1/32* (2007.01)
*H02M 3/335* (2006.01)

(52) U.S. Cl.
CPC .......... *H02M 1/325* (2021.05); *H02J 7/00308* (2020.01); *H02M 3/33523* (2013.01); *H02J 2207/20* (2020.01)

(58) Field of Classification Search
CPC . H02J 7/00308; H02M 1/325; H02M 3/33523
See application file for complete search history.

(56) References Cited

U.S. PATENT DOCUMENTS

| | | | |
|---|---|---|---|
| 2015/0105904 A1* | 4/2015 | Mou | B60L 15/2036 901/1 |
| 2018/0145533 A1* | 5/2018 | Tian | H02M 3/33576 |

* cited by examiner

*Primary Examiner* — Adolf D Berhane
*Assistant Examiner* — Afework S Demisse
(74) *Attorney, Agent, or Firm* — WPAT, PC

(57) ABSTRACT

A charging device and a safety function control circuit and method thereof are provided. When a charging device is not connected to a load, a converted voltage value of a power connection terminal of the charging device is kept to be lower than a safe voltage value so as to maintain a safe mode. The safety function control circuit includes a first control module and a second control module for constant voltage control. The first control module and the second control module perform matching control on a power conversion circuit of the charging device, and in case of a single fault of one of the control modules, the other module is still capable of keeping the converted voltage value to be less than the safe voltage value. Thus, it is ensured that the safe mode stays functional in case of a concurrency of both a single hardware fault and a single firmware fault.

17 Claims, 3 Drawing Sheets

CHARGING DEVICE AND SAFETY FUNCTION CONTROL CIRCUIT AND METHOD THEREOF

BACKGROUND OF THE INVENTION

Field of the Invention

The present invention relates to a charging device and a safety function control circuit and method thereof.

Description of the Prior Art

To improve electrical safety, a charger has numerous conditions and specifications in terms of safety regulations. Regarding voltage limits of live objects that can be touched by the human body, individual different safety regulations have different voltage restrictions. Table-1 below shows various safety regulation standards, voltage limits of live objects that can be touched by a human body and the corresponding provisions and clauses.

TABLE 1

| Safety standard | Voltage limits of live objects that can be touched by human body | Clause |
|---|---|---|
| 60950-1 2nd | SELV: 60 Vdc | Clause 2.2 SELV circuits |
| 62368-1 2nd | ES1: 60 Vdc | Clause 5.2.2.2 Stead-state voltage and current limits |
| 62368-1 3rd | ES1: 60 Vdc | Clause 5.2.2.2 Stead-state voltage and current limits |
| 61010-1 | Dry Location: 60 Vdc Wet Location: 35 Vdc | Clause 6.3 Limit values for Accessible parts |
| 61558-1 2nd | 60 Vdc | Clause 9.1.1 Determination of hazardous-live-parts |
| 61558-1 3rd | 60 Vdc | Clause 9.2.1 Determination of hazardous-live-parts |
| 61558-2-16 1st | 60 Vdc | Clause 9.1.1 Determination of hazardous-live-parts |
| 61558-2-16 2nd | 60 Vdc | Clause 9.2.1 Determination of hazardous-live-parts |
| 60601-1 | 60 Vdc | Clause 5.4.2 Accessible Parts and Applied Parts |
| 60335-1 | SELV: 42.4 Vdc | Clause 3.4.2 safety-extra-low voltage Clause 8.1.4 |
| 60335-2-29 | SELV: 42.4 Vdc | Clause 8 Protection against access of live part |
| UL1310 | Indoor use: 60 Vdc Outdoor use: 30 Vdc | Clause 1 Scope Clause 62 Accessibility of Live Part |
| CSA223 | Indoor use: 30 Vdc Outdoor use: 15 Vdc | Clause 4.14 Maximum output voltage Clause 6.3.4 Maximum output current and power |
| UL1012 | 60 Vdc | Clause 6.15 Low Voltage Limited Energy (LVLE) Circuit |
| CSA107.1 | 42.4 Vdc | Clause 3 Extra-low voltage (ELV) circuit |
| UL1564 | 60 Vdc | Clause 5.6 Low Voltage, Limited-Energy (LVLE) Circuit |
| CSA107.2 | 30 Vdc | Clause 2 Shock Hazard Clause 6.5.2 Leakage Current Test |

Taking the safety standard IEC60335-2-29 (2016, Revision 5) for specifications on charges for example, when a direct-current (DC) output voltage of the charger is higher than a predetermined voltage value (for example, 42.4 Vdc), the safety regulations demand a necessary safety mechanism for preventing a user from an electric shock when the user accidentally touches a power connection terminal of the charger.

In a conventional approach, a metal pin of a power connection terminal of a charger is designed to be unexposed, and at the same time the metal pin is interior shrinkage from an end surface of the power connection terminal, so as to prevent accidental touching of the user. The design above is capable of preventing the user from touching the metal pin of the power connection terminal. However, a large volume of the power connection terminal (a charging head) of the charger may be resulted because the metal pin of the power connection terminal needs to be enveloped by a thicker and heavier housing. For an electric vehicle, and more particularly for a charger of a lightweight electric carrier (for example, an electric scooter, an electric motorcycle, and an electric bicycle), an overly large power connection terminal imposes poor utilization experience as well as immense inconvenience.

SUMMARY OF THE INVENTION

It is an object of the present invention to provide a further safety mechanism for a charger.

It is another object of the present invention to enable a power connection terminal (a charging head) of a charger, under the condition that a metal pin is exposed, to meet safety regulations.

To achieve the above and other objects, the present invention provides a safety function control circuit for a charging device. The charging device includes a power conversion circuit, a power connection terminal, a switch circuit coupled between the power connection terminal and the power conversion circuit, and a first control module coupled to the switch circuit, the power connection terminal and the power conversion circuit. A voltage detection section is defined between the switch circuit and the power conversion circuit. The first control module operates in a safe mode when the power connection terminal is not connected to a load. The safety function control circuit includes a first constant voltage control zone and a second constant voltage control zone. The first constant voltage control zone is configured at the first control module, and is coupled to a feedback control module of the power conversion circuit via a first control terminal of the first control module. In the safe mode, the first control module generates, based on a comparison between a first predetermined voltage value and a first detection voltage value obtained from the voltage detection section, a first control signal used for a converted voltage value of the power conversion circuit to be lower than a safe voltage value. The second constant voltage control zone includes a second control module coupled to the power connection terminal, which has a second control terminal coupled to the feedback control module of the power conversion circuit. In the safe mode, the second control module generates, based on a comparison between a second predetermined voltage value and a second detection voltage value obtained from the voltage detection section, a second control signal used for the converted voltage value of the power conversion circuit to be lower than the safe voltage value. In the safe mode, when the first control signal is not used for the converted voltage value of the power conversion circuit to be lower than the safe voltage value, the feedback control module is controlled by the second control signal. In the safe mode, when the second control signal is not used for the converted voltage value of the power conversion circuit to be lower than the safe voltage value, the feedback control module is controlled by the first control signal.

According to an embodiment of the present invention, the feedback control module further includes an optocoupler. In the safe mode, a path is formed between the optocoupler and a control terminal corresponding to the first control signal or the second control signal lower than a voltage level, so that the power conversion circuit is controlled by the corresponding first or second control module.

According to an embodiment of the present invention, in the safe mode, the first control signal has a first low voltage level, the second control signal has a second low voltage level, the second low voltage level is higher than the first low voltage level, and a path is formed between the optocoupler and a first control terminal having the first low voltage level.

According to an embodiment of the present invention, the feedback control module further includes a logical unit. The logical unit is arranged between the first control terminal and the second terminal, and is configured to transmit the first control signal or the second control signal.

To achieve the above and other objects, the present invention further provides a charging device including a power conversion circuit, a switch circuit, a power connection terminal, a first control module and a second control module. The power conversion circuit includes a feedback control module. The switch circuit is coupled to the power conversion circuit, and a voltage detection section is defined between the switch circuit and the power conversion circuit. The power connection terminal is coupled to the switch circuit, and is configured to connect to a load. The first control module is coupled to the switch circuit, the power connection terminal, the voltage detection section and the feedback control module. The first control module operates in a safe mode when the power connection terminal is not connected to the load, and a first control terminal of the first control module is coupled to the feedback control module. In the safe mode, the first control module generates, based on a comparison between a first predetermined voltage value and a first detection voltage value obtained from the voltage detection section, a first control signal used for a converted voltage value of the power conversion circuit to be lower than a safe voltage value. The second control module is coupled to the power connection terminal, the voltage detection section and the feedback control module, and a second control terminal of the second control module is coupled to the feedback control module. The second control module generates, based on a comparison between a second predetermined voltage value and a second detection voltage value obtained from the voltage detection section, a second control signal used for the converted voltage value of the power conversion circuit to be lower than the safe voltage value. In the safe mode, when the first control signal is not used for the converted voltage value of the power conversion circuit to be lower than the safe voltage value, the feedback control module is controlled by the second control signal. In the safe mode, when the second control signal is not used for the converted voltage value of the power conversion circuit to be lower than the safe voltage value, the feedback control module is controlled by the first control signal.

According to an embodiment of the present invention, the feedback control module further includes an optocoupler. In the safe mode, a path is formed between the optocoupler and a control terminal corresponding to the first control signal or the second control signal, so that the power conversion circuit is controlled by the corresponding first or second control module.

According to an embodiment of the present invention, the first control signal used for the converted voltage value of the power conversion circuit to be lower than the safe voltage value has a first low voltage level, the second control signal used for the converted voltage value of the power conversion circuit to be lower than the safe voltage value has a second low voltage level, the second low voltage level is higher than the first low voltage level, and a path is formed between the optocoupler and the first control terminal having the first low voltage level.

According to an embodiment of the present invention, the feedback control module further includes a logical unit. The logical unit is arranged between the first control terminal and the second terminal, and is configured to transmit the first control signal or the second control signal.

To achieve the above and other objects, the present invention further provides a safety function control method for a charging device, for a converted voltage value of a power connection terminal of the charging device to be lower than a safe voltage value so as to achieve an operation in a safe mode when the charging device is not connected to a load. The method includes a first constant voltage control step, a second constant voltage control step and a determination step. The first control voltage control step compares a first detection voltage value on a power line of a power conversion circuit in the charging device with a first predetermined voltage value, and generates a first control signal for controlling the power conversion circuit. The second control voltage control step, performed only in the safe mode, compares a second detection voltage value on the power line with a second predetermined voltage value, and generates a second control signal for controlling the power conversion circuit. The determination step transmits the first control signal or the second control signal to a feedback control module, so that the converted voltage value of the converted voltage value stays lower than the safe voltage value of the charging device when the first constant voltage control step or the second voltage control step fails.

According to an embodiment of the present invention, the first control signal used for the converted voltage value of the power conversion circuit to be lower than the safe voltage value has a first low voltage level, the second control signal used for the safe voltage value of the power conversion circuit to be lower than the safe voltage value has a second low voltage level, the second low voltage level is higher than the first low voltage level, and the determination step causes the power conversion circuit to be controlled by the first control signal.

To achieve the above and other objects, the present invention further provides a charging device including a power conversion circuit, a switch circuit, a power connection terminal, a first control module and a second control module. The power conversion circuit is configured to receive and convert an alternating-current (AC) power to a converted power, the converted power has a converted voltage value, and the power conversion circuit includes a power conversion module and a feedback control module. The switch circuit is connected to the power conversion circuit, and configured to receive and convert the converted power to an output power. The power connection terminal is connected to the switch circuit, and is configured to receive and output the output power to a load. The first control module is connected to the power conversion circuit and the switch circuit. The first control module performs a handshake with the load via the power connection terminal and generates a charging control signal, and generates a first control signal when it does not perform the handshake with the load. The second control module is connected to the power conversion circuit, and generates a second control signal according to the converted voltage value. The feedback control module is arranged between the power conversion circuit, the first control module and the second control module. When the first control module does not perform the handshake with the load and a single fault occurs in the power conversion circuit, the switch circuit or the first control module, the second control module controls the power conversion circuit according to the second control signal so that the converted voltage value is less than a safe voltage value.

According to an embodiment of the present invention, the first control module controls the power conversion circuit according to the charging control signal when the first control module performs the handshake with the load, so that the converted voltage value is higher than the safe voltage value.

According to an embodiment of the present invention, the first control module controls the power conversion circuit according to the first control signal when the first control module does not perform the handshake with the load, so that the converted voltage value is less than the safe voltage value.

According to an embodiment of the present invention, the single fault is a single firmware fault or a single hardware fault.

According to an embodiment of the present invention, the first control module controls the switch circuit to be turned off when the first control module does not perform the handshake with the load, so that the output power is zero.

According to an embodiment of the present invention, the feedback circuit further includes an optocoupler. A path is formed between the optocoupler and a control terminal corresponding to the charging control signal, the first control signal or the second control signal, so that the power conversion circuit is controlled by the corresponding first or second control module.

According to an embodiment of the present invention, the feedback control module further includes a logical unit. When the first control module performs the handshake with the load, the logical unit receives the charging control signal and the second control signal and outputs the charging control signal.

Accordingly, on the basis of the control of the switch circuit and the mutually collaborated operation of the two constant voltage control mechanisms, in case of whether a single hardware fault or a single firmware fault, the safety mechanism of the charging device provides an output voltage to be lower than a safe voltage, thus complying with specifications of safety regulations. Moreover, even in case of a concurrency of both a single hardware fault and a single firmware fault, one of the two constant voltage control mechanisms is still capable of ensuring the functional operation of the safety mechanism. Thus, a power connection terminal (charging head) of a charger is still enabled to meet specifications of safety regulations under a condition that a metal pin is exposed.

DETAILED DESCRIPTION OF THE EMBODIMENTS

To better understand the objects, features and effects of the present invention, embodiments are given with the accompanying drawings below to further describe details of the present invention.

Singular quantitative expressions, such as "a", "an" and "one", which precede terms used hereinafter, such as units, components, apparatuses, modules, devices, circuits and signals, are not only intended to facilitate explanations but also provide general meanings to the scope of the present disclosure. Therefore, unless otherwise specified obviously, the aforesaid singular quantitative expressions must be interpreted to mean "comprises one or at least one" and include plurals.

Expressions, such as "comprise", "include", "have" and the like, used herein are not limited to essential components of the present disclosure but include any other essential components not definitely disclosed by the present disclosure, yet they are usually intrinsic to the units, components, apparatuses, modules, devices, circuits, signals, or other component usually inherent in the module.

Ordinal numbers, such as "first" and "second," used herein are intended to distinguish or correlate identical or similar units, components, apparatuses, modules, devices, circuits and/or signals and do not necessarily imply what order the units, components, apparatuses, modules, devices, circuits and/or signals are in in terms of space or time. It is understood that in some situations or arrangements the ordinal numbers may be swapped without affecting the effects of implementation of the present disclosure.

Figure 1:
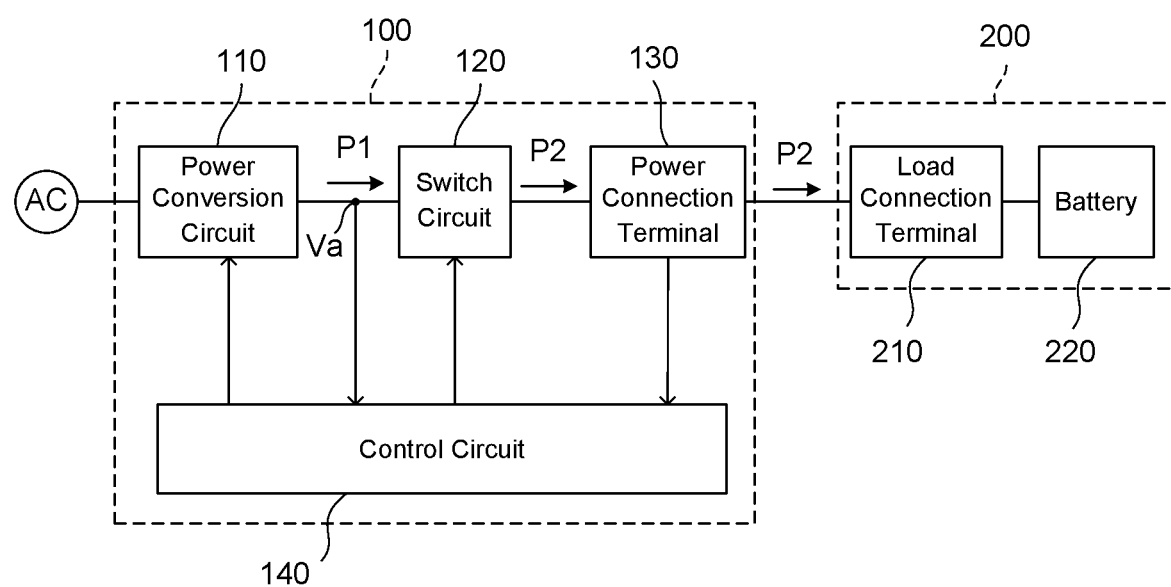
FIG. 1 is a function block schematic diagram of a charging device and a load in a connected state according to an embodiment of the present invention.
Figure 2:
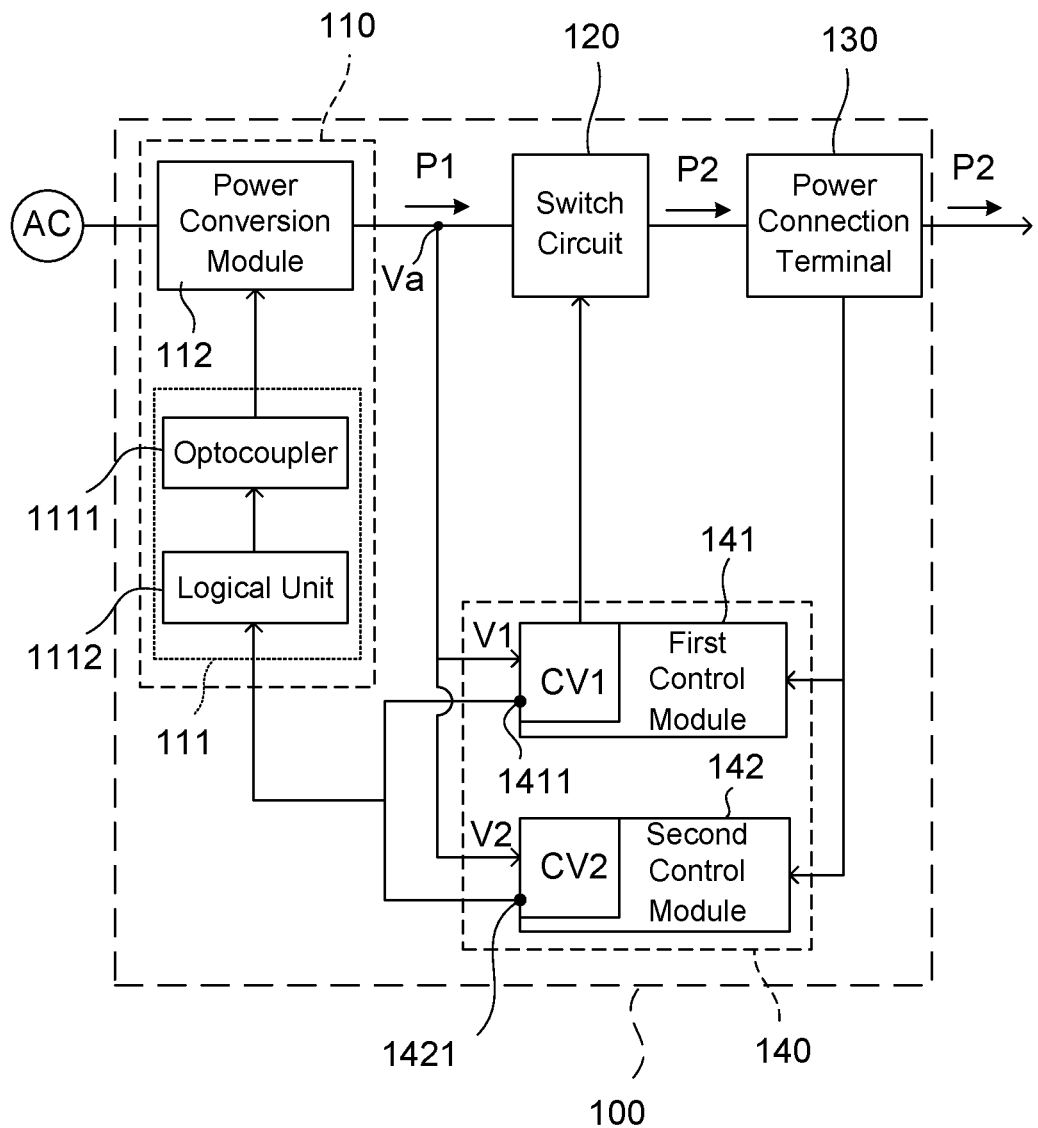
FIG. 2 is a function block schematic diagram of partial circuits of a charging device according to an embodiment of the present invention.

Referring to FIG. 1 and FIG. 2, FIG. 1 shows a function block schematic diagram of a charging device and a load in a connected state according to an embodiment of the present invention, and FIG. 2 shows a function block schematic diagram of partial circuits of a charging device according to an embodiment of the present invention. A charging device 100 is coupled between an alternating-current (AC) power AC and a load 200. The charging device 100 includes a power conversion circuit 110, a switch circuit 120, a power connection terminal 130, and a control circuit 140 configured to control the power conversion circuit 110 and the switch circuit 120. The load 200 includes a load connection terminal 210 and a battery 220. The term "coupled" refers to a direct electrical connection or an indirect electrical connection.

The power conversion circuit 110 is configured to convert the AC power AC to a converted power P1, which has a converted voltage value. Although not shown in FIG. 1, the power conversion circuit 110 of the embodiment may be an existing power conversion circuit having, for example, a fuse, an electromagnetic interference filter, a rectifying circuit, a power factor correction (PFC) circuit for improving a power factor of an AC power, a transformer, an LLC driving circuit and a secondary-side output rectifying circuit. The power conversion circuit 110 converts the AC power AC to the converted power P1 according to a control signal of the control circuit 140.

The switch circuit 120 is coupled between the power connection terminal 130 the power conversion circuit 110, and is configured to receive and convert the converted power P1 to an output power P2. A voltage detection section is defined between the switch circuit 120 and the power conversion circuit 110. The power connection terminal 130 is connected to the switch circuit 120, and is configured to receive and output the output power P2 to the load 200.

The control circuit 140 can correspondingly control the power conversion circuit 110 based on a detection voltage value (equivalent to a converted voltage value) of a voltage detection point Va in the voltage detection section. The control circuit 140 includes a constant voltage control module and a constant current control module, which are equivalent to a circuit block configured to control the charging device 100. The control circuit 140 includes a first control module 141 and a second control module 142. The first control module 141 and the second control module 142 are both constant voltage control circuits, so that a voltage of the output power P2 of the charging device 100 is controlled at a constant voltage value. The first control module 141 performs a handshake with the load 200 via the power connection terminal 130 and generates a charging control signal. When the first control module 141 does not perform the handshake with the load 200, it generates a first control signal. The second control circuit 142 generates a second control signal according to a detection voltage value (equivalent to a converted voltage value) of the voltage detection point Va.

Specifically, when the load connection terminal 210 is connected to the power connection terminal 130, the first control module 141 obtains information, indicating that a connection between the load 200 and the charging device 100 is complete, from the power connection terminal 130. For example, a connection interface usually includes multiple pins, and a handshake signal indicating the completion of the handshake between the load 200 and the charging device 100 can be transmitted via a predetermined pin to the first control module 141.

The first control module 141 can correspondingly generate the charging control signal based on the completion of the handshake. The charging control signal can control the power conversion circuit 110 and the switch circuit 120. Regarding the control on the power conversion circuit 110, the first control module 141 controls the power conversion circuit 110 to convert the AC power AC, and renders the converted voltage value of the converted power P1 output from the power conversion circuit 110 to be higher than a predetermined safe voltage value, that is, a safe voltage value (for example, 42.4 V) under safety regulations, so as to provide the battery 220 of the load 200 with a required charging voltage. Regarding the control on the switch circuit 120, the first control module 141 controls the switch circuit 120 to be turned on based on the charging control signal so as to output the output power P2.

In other words, when the load 200 and the charging device 100 are not coupled, that is, not being in a handshake state, if the AC power AC is continuously supplied to the power conversion circuit 110, the converted voltage value of the output power P2 output from the power connection terminal 130 still needs to be controlled to be less than the predetermined safe voltage value. As such, even if the metal pin of the power connection terminal 130 is exposed, damaged that is not allowed by the safety regulations upon the human body as a result of accidental touching is eliminated.

Thus, the control on the output voltage of the charging device 100 is determined by the control performed by the control circuit 140 on the switch circuit 120 and the power conversion circuit 110. Therefore, the safety mechanism of the charging device 100 is deployed on a loop between the control circuit 140, the switch circuit 120 and the power conversion circuit 110, and on the firmware control of the control circuit 140. That is, whether the safety mechanism is successful is determined by whether the safety mechanism can still be normally started in case of a concurrency of both a single hardware fault (for example, a short circuit or open circuit of a component) and a single firmware fault. Both a hardware fault and a firmware fault are used as an indicator for ensuring whether the safety mechanism of the charging device 100 is functional.

In an embodiment of the present invention, a single firmware fault is defined on a control loop of the control circuit 140 and the power conversion circuit 110. The reason for the above is that, the control module in the control circuit 140 outputting an error signal (so that the power conversion circuit 110 can be operated to generate a signal of the converted power P1 having a value higher than the safe voltage value) can then correspond to a single firmware fault. That is, an output of the control module in the control circuit 140 can simulate a situation of a pin outputting an error signal by the occurrence of a fault (for example, a short circuit) on the loop, achieving triggering of a single firmware fault. Further, when neither of a single hardware fault nor a single firmware fault causes a failure of the safety mechanism of the charging device 100, it is considered that safety regulations are met. Accordingly, even if the metal pin of the power connection terminal 130 is exposed, damaged that is not allowed by the safety regulations upon the human body as a result of accidental touching is eliminated. The firmware of the control module 140 is not required to undergo complicated and time-consuming software validation.

Moreover, the power conversion circuit 110 includes a feedback control module 111 and a power conversion module 112. The control circuit 140 includes a first control module 141 and a second control module 142. The feedback control module 111 is arranged between the power conversion module 112, the first control module 141 and the second control module 142.

In an embodiment of the present invention, the safety mechanism is established by a safety function control circuit in the control circuit 140. The safety function control circuit includes a first constant voltage control zone CV1 and a second constant voltage control zone CV2. The first constant voltage control zone CV1 is configured in the first control module 141, and the second constant voltage control zone CV2 is configured in the second control module 142. Control terminals of both the constant voltage control zones are coupled to the feedback control module 111 of the power conversion circuit 110.

When the power connection terminal 130 is not connected to a load (not performing a handshake), the charging device 110 operates in a safe mode. In the safe mode, when an output terminal of the power connection terminal 130 contains the output power P2, the safety function control circuit needs to have the voltage value of the output power P2 be less than the predetermined safe voltage value, that is, a safe voltage value (for example, 42.4 V) under the safety regulations, so as to meet the safety regulations. When the first control module 141 does not perform the handshake with the load 200, the first control module 141 controls the power conversion circuit 110 according to the first control signal, so that the converted voltage value is less than the safe voltage value. Specifically, in the first constant voltage control zone CV1, the first control module 141 is coupled to the feedback control module 111 of the power conversion circuit 110 via a first control terminal 1411. In the safe mode, the first control module 141 is configured to provide the first control signal to the feedback control module 111 based on a comparison between a first predetermined voltage value and a first detection voltage value V1. The first detection voltage V1 is obtained from a voltage detection section (as the voltage detection point Va shown in FIG. 2). The first control signal is configured to have the converted voltage value of the converted power P1 generated by the power conversion circuit 110 be lower than a predetermined safe voltage value.

In the second constant voltage control zone CV2, the second control module 142 is coupled to the power conversion terminal 130. A second control terminal 1421 of the second control module 142 is coupled to the feedback control module 111 of the power conversion circuit 110. In the safe mode, the second control module 142 is configured to provide a second control signal to the feedback control module 111 based on a comparison between a second predetermined voltage value and a second detection voltage value V2. The second detection voltage V2 is obtained from the voltage detection section (as the voltage detection point Va shown in FIG. 2). The second control signal is configured to have the converted voltage value of the converted power P1 generated by the power conversion circuit 110 be lower than the predetermined safe voltage value.

The control terminals (1411 and 1421) of both the first control module 141 and the second control module 142 are configured to couple to the feedback control module 111. Under the collaborated operation, in case of a single firmware fault of the first control module 141, the first control signal provided by the first control module 141 causes the converted power P1 generated by the power conversion circuit 110 to have a voltage higher than a safe voltage (for example, an operating voltage needed by a load during a handshake, so as to achieve realization of a fault). In other words, in case of a single firmware fault of the first control module 141, the first control signal cannot render the converted voltage value of the power conversion circuit 110 to be lower than the safe voltage value. At this point, the feedback control module 111 is configured to be controlled by the second control signal generated by the second control module 142.

On the other hand, in case of a single firmware fault of the second control module 142, the second control signal provided by the second control module 142 causes the converted power P1 generated by the power conversion circuit 110 to have a voltage higher than a safe voltage (for example, an operating voltage needed by a load during a handshake, so as to achieve realization of a fault). In other words, in case of a single firmware fault of the second control module 142, the second control signal cannot render the converted voltage value of the power conversion circuit 110 to be lower than the safe voltage value. At this point, the feedback control module 111 is configured to be controlled by the first control signal generated by the first control module 141.

In one embodiment, the feedback control module 111 is controlled by a control signal having a lower voltage level, that is, a path is formed between the feedback control module 111 and a control terminal corresponding to the control signal having a lower voltage level, so as to be controlled to the corresponding first control module 141 or second control module 142.

Alternatively speaking, when no any fault occurs and it is in a normal charging state (during a handshake), the load connection terminal 210 in FIG. 1 is connected to the power connection terminal 130, and the metal pin of the power connection terminal 130 is not exposed. The first control module 141 and the second control module 142 are configured such that, during a handshake, the voltage level (for example, 58.5 V) of a first charging control signal of the first control module 141 is lower than the voltage level (for example, 60 V) of a second charging control signal of the second control module 412. A path is formed between the feedback control module 111 and a control terminal of the one having a lower voltage level between the two (the first charging control signal and the second charging control signal). As such, in a normal operating condition during a handshake, the feedback control module 111 is controlled by the first control module 141. The first charging control signal generated by the first control module 141 during the handshake causes the converted power P1 generated by the power conversion circuit 110 to have a converted voltage value higher than the safe voltage value (to form a charging voltage provided to the load). At this point (during the handshake), the second control module 142 is configured to be ineffective.

In the safe mode (when no handshake is performed), the power connection terminal 130 in FIG. 1 is not connected to the power connection terminal 210, and the metal pin of the power connection terminal 130 is exposed. In the safe mode, the first control signal has a first low voltage level, the second control signal has a second low voltage level, and the second lower voltage level is higher than the first low voltage level. Moreover, the switch circuit 120 controlled by the first control module 141 is also turned off, such that the output power P2 is zero. The above is the operation conditions in the safe mode (when no handshake is performed) in the absence of any fault.

When the first control module 141 does not perform the handshake with the load 200 and a single fault occurs in the power conversion circuit 110, the switch circuit 120 or the first control module 14, the second control module 142 controls the power conversion circuit 110 according to the second control signal so that the converted voltage value is less than the safe voltage value. More specifically, in the safe mode described above (when no handshake is performed), the following operation takes place in case of a concurrency of both a single hardware fault and a single firmware fault. Regarding a single hardware fault, based on the configuration in the embodiment of the present invention, the single hardware fault is for example, a short circuit of an element in the switch circuit 120, such that the converted power P1 is converted to the output power P2 and is provided to the power connection terminal 130. Regarding a single firmware fault, based on the configuration in the embodiment of the present invention, the single firmware fault is for example, firmware used by the first control module 141 or the second control module 142 for controlling the switch circuit 120 has failed, such that the converted power P1 is also converted to the output power P2 and is provided to the power connection terminal 130. For another example, a single firmware fault is that, firmware used by the first control module 141 or the second control module 142 for controlling the feedback control module 111 has failed, and the corresponding control signal causes the converted voltage value of the converted power P1 to be higher than the safe voltage value.

Specifically, in case of a fault of the first control module 141, the first low voltage level of the first control signal provided to the feedback control module 111 is increased. One of the possibilities that the first control module 141 may malfunction and become a charging state due to the fault. However, since that the second control module 142 does not fail and the second voltage level of the second control signal in the safe mode is normal (not used for charging control), the feedback control module 111 is controlled by the second control module 142, such that the converted power P1 generated by the power conversion module 111 has a converted voltage value lower than the safe voltage value. Thus, even in case of a concurrency of both a single hardware fault between the first control module 141 and the switch circuit 121 (for example, a short circuit, in a way that the switch circuit 120 cannot be turned off in the safe mode), and a fault on the control of feedback control module 111 by the first control module 141 (for example, malfunctioning and becoming in a charging state), the second control module 142 can still stay functional, so that the power connection terminal 130 of the charging device 110 has a voltage value lower than the safe voltage value.

On the other hand, in case of a fault of the second control module 142, the second low voltage level of the second control signal provided to the feedback control module 111 is increased. One of the possibilities is that the second control module 142 may malfunction and become a charging state due to the fault. However, since that the first control module 141 does not fail and the first voltage level of the first control signal in the safe mode is normal (not used for charging control), the feedback control module 111 is controlled by the first control module 141, such that the converted power P1 generated by the power conversion module 111 has a converted voltage value lower than the safe voltage value. Thus, even in case of a concurrency of both a single hardware fault between the first control module 141 and the switch circuit 121 (for example), and a single firmware fault on the control of the feedback control module 111 by the second control module 142 (for example, malfunctioning and becoming in a charging state), the first control module 111 can still stay functional, so that the power connection terminal 130 of the charging device 110 has a voltage value lower than the safe voltage value.

In the embodiment above, the feedback control module 111 includes an optocoupler 1111 and a logical unit 1112. A path is formed between the optocoupler 1111 and a control terminal corresponding to the charging control signal, the first control signal or the second control signal, so that the power conversion circuit 110 is controlled by the corresponding first control module 141 or second control module 142 to accordingly perform voltage adjustment. The logical unit 1112 is simultaneously coupled to the first control terminal 1411 of the first control module 141 and the second control terminal 1421 of the second control module 142. When the first control module 141 performs a handshake with the load, the logical unit 1112 receives the charging control signal (or referred to as a first charging control signal) generated by the first control module 141 and the second control signal (or referred to as a second charging control signal) generated by the second control module 142, and outputs a charging control signal (based on the feedback control module 111 receiving only a control signal having a lower voltage level).

Figure 3:
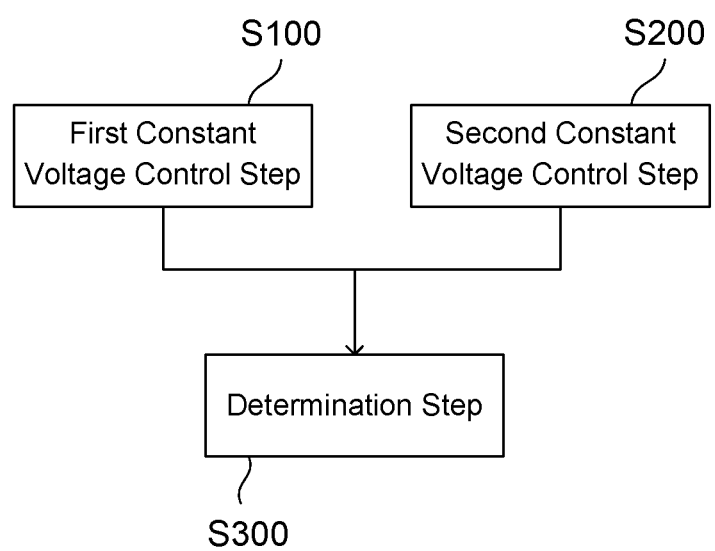
FIG. 3 is a flowchart of a safety function control method for a charging device according to an embodiment of the present invention.

Next, refer to FIG. 3 showing a flowchart of a safety function control method for a charging device according to an embodiment of the present invention. On the basis of the circuit implementation above, when the safety function control method for a charging device provided according to an embodiment of the present invention is applied to the charging device 100 that is not connected to the load 200, the converted voltage value output by the power connection terminal 130 of the charging device 100 is kept to be lower than the safe voltage value, thereby ensuring operations in the safe mode. The safety function control method includes steps of: a first constant voltage control step S100, a second constant voltage control step S200 and a determination step S300.

The first constant voltage control step S100 refers to comparing a first detection voltage value on a power line of a power conversion circuit in the charging device with a first predetermined voltage value, and generating a first control signal for controlling the power conversion circuit. The power line may correspond to a transmission path, which is alternatively referred to as a voltage detection section, of the converted power P1 in FIG. 1 and FIG. 2. The first constant voltage control step S100 is performed by a microcontroller unit (MCU) (for example, the first control module 141 in FIG. 2).

The second constant voltage controls step S200 is performed only in a safe mode, and refers to comparing a second detection voltage value on the power line with a second predetermined voltage value, and generates a second control signal for controlling the power conversion circuit. The second constant voltage control step S200 is performed by another microcontroller unit (MCU) (for example, the second control module 142 in FIG. 2).

The determination step S300 causes the first control signal or the second control signal to be transmitted to the power conversion circuit. In case of a fault of the first constant voltage control step S100 or the second constant voltage control step S200, the determination step S300 enables the non-failing constant voltage control step to perform control, thus keeping the converted voltage value of the charging device 100 to be lower than a safe voltage value in the safe mode. For example, in terms of functional operation control, a feedback control module in the power conversion circuit includes an optocoupler that receives the first control signal or the second control signal. The optocoupler has an operating voltage level (for example, 5V), and the first control signal or the second control signal having a level lower than the operating voltage level can then be transmitted to a power conversion module in the power conversion circuit by the optocoupler (that is, providing the power conversion module with a type of feedback control based on the first control signal or the second control signal).

By configuring two constant voltage control steps for controlling the feedback control module in the charging device, as well as matching based on the voltage level above, failure control in case of a concurrency of both a single firmware fault and a single hardware fault can be compensated, so that the power connection terminal 130 of the charging device 100 is persistently kept with a voltage value lower than a safe voltage value in the safe mode.

Accordingly, under the configuration of the embodiment of the present invention, a normal operation is ensured even in case of a concurrency of both a single firmware fault and a single hardware fault, thereby meeting safety regulations. Thus, an electric carrier (for example, an electric scooter, an electric motorcycle, and an electric bicycle) can use a charger having a power connection terminal that is configured as an exposed metal pin, without involving a large and heavy housing with a significantly increased volume.

While the invention has been described by way of example and in terms of the preferred embodiments, one person skilled in the art can understand that the embodiments are for explaining the present invention, but are not to be construed as limitations to the present invention. It is to be noted that, equivalent modifications and arrangements made based on the embodiments are covered within and the scope of the present invention. Therefore, the scope of the present invention should be accorded by the broadest interpretation of the appended claims of the application.

What is claimed is:

1. A safety function control circuit for a charging device, the charging device comprising a power conversion circuit, a power connection terminal, a switch circuit coupled between the power connection terminal and the power conversion circuit, and a first control module coupled to the switch circuit, the power connection terminal and the power conversion circuit; a voltage detection section being defined between the switch circuit and the power conversion circuit, the first control module operating in a safe mode when the power connection terminal is not connected to a load; the safety function control circuit comprising:
a first constant voltage control zone, configured at the first control module, and coupled to a feedback control module of the power conversion circuit via a first control terminal of the first control module, wherein in the safe mode, the first control module generates, based on a comparison between a first predetermined voltage value and a first detection voltage value obtained from the voltage detection section, a first control signal used for a converted voltage value of the power conversion circuit to be lower than a safe voltage value; and
a second constant voltage control zone, comprising a second control module coupled to the power connection terminal, a second control terminal of the second control module being coupled to the feedback control module of the power conversion circuit, wherein in the safe mode, the second control module generates, based on a comparison between a second predetermined voltage value and a second detection voltage value obtained from the voltage detection section, a second control signal used for the converted voltage value of the power conversion circuit to be lower than the safe voltage value;
wherein in the safe mode, when the first control signal is not used for the converted voltage value of the power conversion circuit to be lower than the safe voltage value, the feedback control module is controlled by the second control signal, and
wherein in the safe mode, when the second control signal is not used for the converted voltage value of the power conversion circuit to be lower than the safe voltage value, the feedback control module is controlled by the first control signal.

2. The safety function control circuit of claim 1, wherein the feedback control module further comprises:
an optocoupler;
wherein in the safe mode, a path is formed between the optocoupler and a control terminal corresponding to the first control signal or the second control signal having a level lower than a voltage level, so that the power conversion circuit is controlled by the corresponding first or second control module.

3. The safety function control circuit of claim 2, wherein in the safe mode, the first control signal has a first low voltage level, the second control signal has a second low voltage level, the second low voltage level is higher than the first low voltage level, and the path is formed between the optocoupler and the first control terminal having the first low voltage level.

4. The safety function control circuit of claim 1, wherein the feedback control module further comprises:
a logical unit, arranged between the first control terminal and the second control terminal, the logical unit configured to transmit the first control signal or the second control signal.

5. A charging device, comprising:
a power conversion circuit, comprising a feedback control module;
a switch circuit, coupled to the power conversion circuit, a voltage detection section being defined between the switch circuit and the power conversion circuit;
a power connection terminal, coupled to the switch circuit and configured to connect to a load;
a first control module, coupled to the switch circuit, the power connection terminal, the voltage detection section and the feedback control module, the first control module operating in a safe mode when the power connection terminal is not connected to the load, and a first control terminal of the first control module being coupled to the feedback control module, and in the safe mode, the first control module generating, based on a comparison between a first predetermined voltage value and a first detection voltage value obtained from the voltage detection section, a first control signal used for a converted voltage value of the power conversion circuit to be lower than a safe voltage value; and
a second control module, coupled to the power connection terminal, the voltage detection section and the feedback control module, and a second control terminal of the second control module being coupled to the feedback control module, the second control module generating, based on a comparison between a second predetermined voltage value and a second detection voltage value obtained from the voltage detection section, a second control signal used for the converted voltage value of the power conversion circuit to be lower than the safe voltage value;
wherein in the safe mode, when the first control signal is not used for the converted voltage value of the power conversion circuit to be lower than the safe voltage value, the feedback control module is controlled by the second control signal, and
wherein in the safe mode, when the second control signal is not used for the converted voltage value of the power conversion circuit to be lower than the safe voltage value, the feedback control module is controlled by the first control signal.

6. The charging device of claim 5, wherein the feedback control module further comprises:
an optocoupler;
wherein in the safe mode, a path is formed between the optocoupler and a control terminal corresponding to the first control signal or the second control signal, so that the power conversion circuit is controlled by the corresponding first or second control module.

7. The charging device of claim 6, wherein the first control signal used for the converted voltage value of the power conversion circuit to be lower than the safe voltage value has a first low voltage level, the second control signal used for the converted voltage value of the power conversion circuit to be lower than the safe voltage value has a second low voltage level, the second low voltage level is higher than the first low voltage level, and the path is formed between the optocoupler and the first control terminal having the first low voltage level.

8. The charging device of claim 5, wherein the feedback control module further comprises:

a logical unit, arranged between the first control terminal and the second control terminal, the logical unit configured to transmit the first control signal or the second control signal.

9. A safety function control method for a charging device, applied to have a converted voltage value of a power connection terminal of the charging device be lower than a safe voltage value so as to achieve an operation in a safe mode when the charging device is not connected to a load, the method comprising:
- a first constant voltage control step, comprising comparing a first detection voltage value on a power line of a power conversion circuit in the charging device with a first predetermined voltage value, and generating a first control signal for controlling the power conversion circuit;
- a second constant voltage control step, performed only in the safe mode, comparing a second detection voltage value on the power line with a second predetermined voltage value, and generating a second control signal for controlling the power conversion circuit; and
- a determination step, transmitting the first control signal or the second control signal to a power conversion circuit, so that the converted voltage value of the charging device stays lower than the safe voltage value when the first constant voltage control step or the second constant voltage control step fails.

10. The safety function control method of claim 9, wherein the first control signal used for the converted voltage value of the power conversion circuit to be lower than the safe voltage value has a first low voltage level, the second control signal used for the converted voltage value of the power conversion circuit to be lower than the safe voltage value has a second low voltage level, the second low voltage level is higher than the first low voltage level, and the determination step causes the power conversion circuit to be controlled by the first control signal.

11. A charging device, comprising:
- a power conversion circuit, configured to receive and convert an alternating-current (AC) power to a converted power, the converted power having a converted voltage value, and the power conversion circuit comprising a power conversion module and a feedback control module;
- a switch circuit, connected to the power conversion circuit, and configured to receive and convert the converted power to an output power;
- a power connection terminal, connected to the switch circuit, and configured to receive and output the output power to a load;
- a first control module, connected to the power conversion circuit and the switch circuit, the first control module performing a handshake with the load via the power connection terminal and generating a charging control signal, and generating a first control signal when it does not perform the handshake with the load;
- a second control module, connected to the power conversion circuit, and generating a second control signal according to the converted voltage value;
- wherein the feedback control module is arranged between the power conversion circuit, the first control module and the second control module;
- wherein, when the first control module does not perform the handshake with the load and a single fault occurs in the power conversion circuit, the switch circuit or the first control module, the second control module controls the power conversion circuit according to the second control signal so that the converted voltage value is less than a safe voltage value.

12. The charging device of claim 11, wherein the first control module controls the power conversion circuit according to the charging control signal when the first control module performs the handshake with the load, so that the converted voltage value is higher than the safe voltage value.

13. The charging device of claim 11, wherein the first control module controls the power conversion circuit according to the first control signal when the first control module does not perform the handshake with the load, so that the converted voltage value is less than the safe voltage value.

14. The charging device of claim 11, wherein the single fault is a single firmware fault or a single hardware fault.

15. The charging device of claim 11, wherein the first control module controls the switch circuit to be turned off when the first control module does not perform the handshake with the load, so that the output power is zero.

16. The charging device of claim 11, wherein the feedback control module further comprises:
- an optocoupler;
- wherein a path is formed between the optocoupler and a control terminal corresponding to the charging control signal, the first control signal or the second control signal, so that the power conversion circuit is controlled by the corresponding first or second control module.

17. The charging device of claim 11, wherein the feedback control module further comprises:
- a logical unit, receiving the charging control signal and the second control signal and outputting the charging control signal when the first control module performs the handshake with the load.

* * * * *